United States Patent [19]

Sheffer

[11] Patent Number: 4,520,992
[45] Date of Patent: Jun. 4, 1985

[54] SLOW-CLOSING VALVE MECHANISM

[75] Inventor: Ralph L. Sheffer, Arcadia, Calif.

[73] Assignee: Adams Rite Products, Inc., Glendale, Calif.

[21] Appl. No.: 506,736

[22] Filed: Jun. 22, 1983

[51] Int. Cl.³ .............................................. F16K 31/12
[52] U.S. Cl. ........................................ 251/48; 251/52
[58] Field of Search ....................... 251/15, 48, 22, 23, 251/51, 52

[56] References Cited

U.S. PATENT DOCUMENTS

| 192,642 | 7/1877 | Eckert | 251/51 |
|---|---|---|---|
| 1,274,195 | 7/1918 | Purnell | 251/23 |
| 1,995,792 | 3/1935 | Brown | 251/52 |
| 2,710,736 | 6/1955 | Miller | 251/51 |
| 2,991,795 | 7/1961 | Fraser et al. | 137/244 |
| 3,038,169 | 6/1962 | O'Brien | 251/52 |
| 3,065,948 | 11/1962 | Nolan | 251/52 |

FOREIGN PATENT DOCUMENTS 1115342  4/1956  France ................. 251/52

Primary Examiner—Samuel Scott
Assistant Examiner—Noah Kamen
Attorney, Agent, or Firm—Whann & McManigal

[57] ABSTRACT

A slow-closing valve mechanism for controlling metered flow of water for a predetermined time interval from a main inlet to a main outlet in which a timing chamber is provided with a valve seat at one end and an inwardly adjacent main flow inlet and a bleeder opening at its opposite end. A reciprocable valve stem extends through the valve seat and carries a main valve that is biased towards the seat by a relatively long low rate coiled spring surrounding the stem, and also carries a piston that is movable in a valve opening direction by a manually operable actuator at the outer end of the stem, and in a timed valve closing direction at a rate determined by a fixed hydraulic flow passage of an elongate capillary tube connected with the bleeder opening, this tube being coiled externally of the timing chamber and having its inlet in communication with the main inlet flow passage. The valve closure timing interval is variable by means of an axially adjustable end cap extension on the outer end of the stem, which is engageable by the manual actuator to effect opening of the main valve a distance as determined by engagement of the end cap extension with a fixed abutment stop.

15 Claims, 3 Drawing Figures

SLOW-CLOSING VALVE MECHANISM

PRIOR ART

In the prior art, there are a number of self-closing valve mechanisms which are arranged for automatically shutting off flow in faucets, toilets and the like, within an adjustable predetermined time interval. The closest art known to applicant are the following patents:

U.S. Pat. No. 1,995,792—Mar. 26, 1935
U.S. Pat. No. 2,710,736—June 14, 1955
U.S. Pat. No. 2,991,795—July 11, 1961
U.S. Pat. No. 3,038,169—June 12, 1962
U.S. Pat. No. 3,065,948—Nov. 27, 1962

BACKGROUND OF THE INVENTION

The present invention relates generally to self-closing valve mechanisms.

Having reference to the prior art patents noted above, it will be seen that it has been generally known to provide self-closing valve arrangements of the type which utilize a dashpot arrangement for controlling the closing time of the valve. Commonly, such arrangements comprise a piston member connected with the main valve, the piston member being reciprocably movable within a timing chamber, and means being provided for controlling biased movement of the valve into a seated closed position.

The known prior art structures differ primarily in the structural arrangement of the piston timing means and the manner of adjusting the timing interval. A major consideration in self-closing valves utilizing a dashpot timing arrangement, is to utilize a structure such that the valve will require little maintenance, and once the timing interval is adjusted it will maintain the timing interval with a minimum variation for relatively long periods of operation, and require little or no resetting or adjustments.

The present invention is considered to constitute an improvement particularly with respect to self-closing valve structures such as disclosed in the above-noted prior art U.S. Pat. Nos. 1,995,792 and 3,038,169. In each of these patents, the valve closing time interval is determined by a dashpot arrangement in which the spring biased piston is moved in a closing direction at a rate determined by fluid flow into the timing chamber through a bleeder opening at a rate controlled by a screw compressible porous material in the form of a felt washer. With such arrangements, it has been found difficult to maintain a constancy of the timing interval over relatively long periods of time; and in order to adjust the timing interval by changing the compressing screw for the felt washer, it is necessary to disassemble the valve and exercise procedures which are time consuming and difficult to effect.

In the present invention, the self-closing valve mechanism has in general been redesigned throughout in order to provide improved operating characteristics which will require little attention and which will be maintained over relatively long periods of operation.

In this respect, an important feature is that, instead of utilizing a compressible felt washer or other variable means for controlling the bleeder opening, the inlet fluid flow through the bleeder opening is controlled by a fixed hydraulic restriction in the form of a capillary tube coiled around the exterior of the dashpot. This capillary tube is nominally 0.013 inch inside diameter and approximately 1.5 feet in length. The outlet end of this tube forms the bleed opening, and the inlet end of the tube is fitted with an uncompressed porous plastic filter to protect the tube from clogging.

Another feature of the present invention resides in the provision of readily accessible means for adjusting the closing stroke of the valve. For this purpose, the outer end of the valve stem is provided with an axially adjustable cap formed with an abutment stop, this cap being adjustable to vary the open position of the valve, as determined by the stop, and consequently the interval of time required to close the valve.

Another feature of the present invention comprises the use of a relatively much longer coiled spring for biasing the valve in a closing direction. This spring has a lower spring rate which provides a more even biasing force during timing and a higher final closure force in the closed position of the valve.

As a result of the above-mentioned features, tests of valve structures incorporating these features have indicated that the timing has been held within a 2 second total tolerance for more than 27,000 cycles without cleaning or other servicing, and that some of the valve components have been operated well over 75,000 cycles.

SUMMARY OF THE INVENTION

The present invention is more particularly concerned with improvements in self-closing valve mechanisms of the type in which the valve closing time interval is determined by a dashpot arrangement in which a spring biased piston is moved in a valve closing direction within a timing chamber at a rate determined by fluid flow into the timing chamber through a bleeder opening that is covered by a compressible porous material, such as a felt washer, and wherein the rate of flow can be regulated by varying the extent of compression of the porous material.

Having in mind the disadvantages and undesirable operating characteristics inherent in self-closing valve mechanisms with timing means of the character described above, it is one object of the present invention to provide a fixed substantially non-variable hydraulic restrictive fluid flow inlet to the bleeder opening of the timing chamber, and associated readily accessible means for varying the length of the valve closing stroke of the piston in the timing chamber and thus regulate the valve closing time interval.

A further object and feature resides in the provision of a unique and improved dashpot means for determining the closure time interval of a self-closing valve mechanism, and in which the bleeder opening of the timing chamber has an inlet connection with an elongate externally mounted capillary tube.

Another object and feature resides in the provision of a dashpot timing means for a slow, self-closing valve mechanism in which the closing movement of the valve is at a substantially constant rate, and wherein the closing time interval is adjustably variable by means of an axially adjustable extension of the outer end of the associated valve stem.

It is also an object of the herein described invention to provide a slow-closing valve mechanism having improved operating characteristics, and in which the valve is biased towards a valve close position by a relatively long low rate spring in order to provide a more even valve biasing force during closure, and a higher final force at valve closure.

Further objects and features of the invention will be brought in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only.

DESCRIPTION OF A PREFERRED
EMBODIMENT OF THE INVENTION

Figure 1:
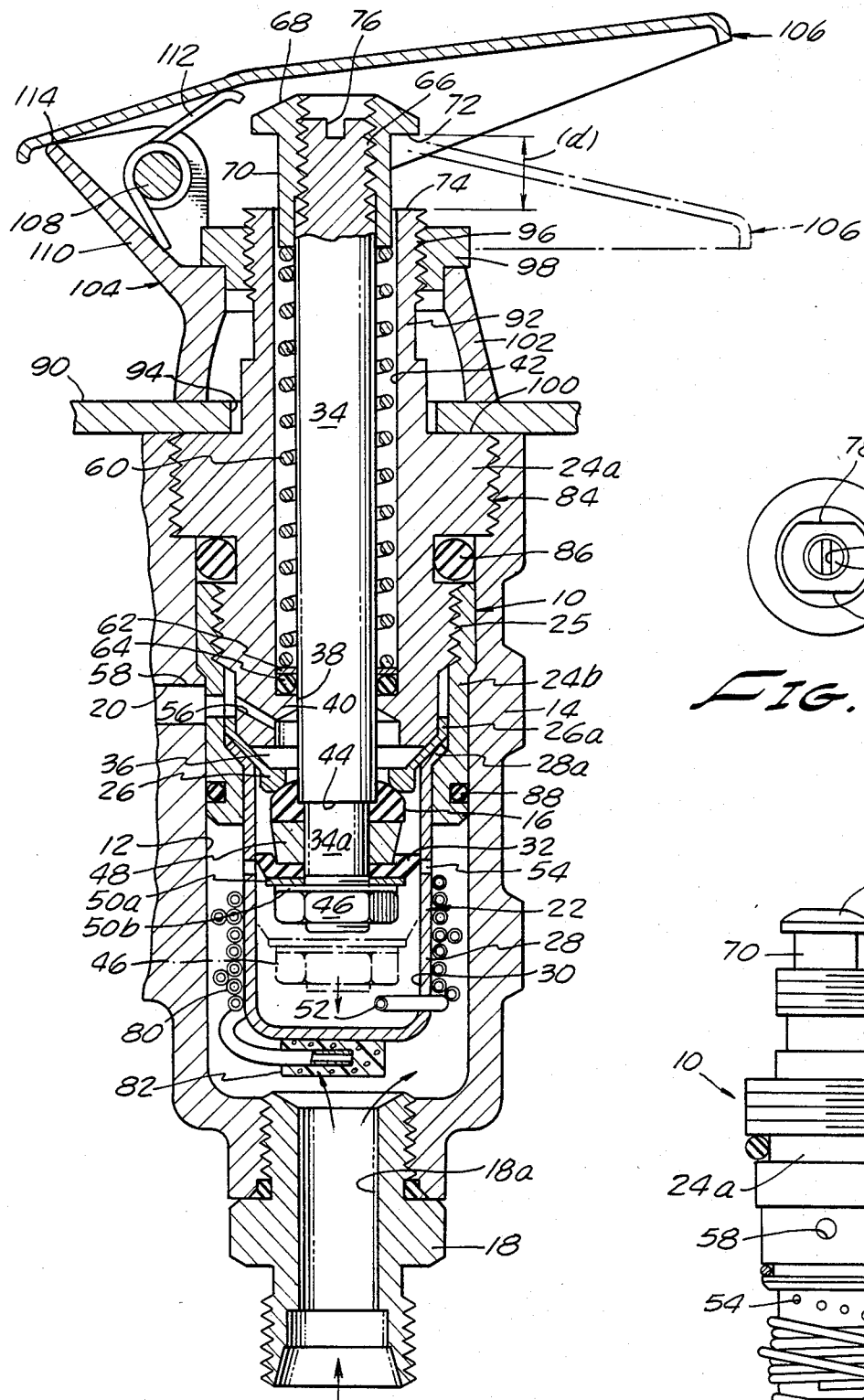
FIG. 1 is an enlarged vertical sectional view of a slow-closing valve mechanism embodying the features of the present invention, and shows the valve structure within a valve casing together with a manually operable actuator handle as being secured to a supporting plate member.
Figure 3:
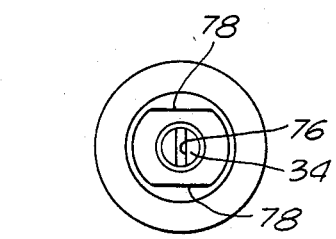
FIG. 3 is a fragmentary plan view of the upper end of the valve stem and its associated extension cap, and showing the adaptation thereof for the reception of appropriate tools to permit rotation of the cap while holding the stem against rotation.

Referring more specifically to the drawings, the slow-closing valve mechanism according to the present invention is illustrated in FIG. 1 as comprising a valve assembly in the form of a cartridge unit, as generally indicated by the numeral 10, that is removably mounted within a chamber 12 of a cartridge receiving casing 14 and provides an automatic shut-off valve arrangement 16 for controlling the flow of water between a main inlet 18a formed in an inlet coupling 18, and a main outlet 20 formed in the cartridge receiving casing 14.

Automatic slow-closing valve mechanisms of the general type embodied in the present invention are known generally in the prior art and are particularly useful in the control of water flow in faucets, toilets and the like, and in such installations are usually provided with a more-or-less conventional dashpot arrangement, as generally indicated in the present invention by the numeral 22 which is arranged, as will hereafter be described in detail, to provide a predetermined time closing interval for automatically restoring the main valve 16 from its unseated open position to a seated closed position.

More specifically, the cartridge unit 10 of the present invention is constructed to provide a two-part valve body in which a main body section 24a is threadedly connected at 25 in end-to-end relation to a body extension section 24b with which it coacts to clampingly engage superposed mounting flanges 26a and 28a respectively of an annular valve seat 26 and a dashpot cylinder 28. The dashpot cylinder encloses a cylindrical timing chamber 30 which extends below the valve seat 26 and provides a space within which the valve 16 and associated cup washer 32 at the inner end of an elongate valve stem 34 are axially movable. The valve stem 34 extends upwardly through the annular valve seat 26, an outlet flow cavity 36 and a guide opening 38 formed by a radially inwardly extending flange 40 at the inner end of an elongate axially extending bore 42 formed in the main body section 24a.

The inner end of the stem 34 is fabricated to provide an end portion 34a of reduced diameter that extends from a radial abutment flange 44 and is threaded at its end to receive a retaining nut 46 which coacts with the abutment flange 44 to clampingly secure the main valve 16, spacer element 48, and cup washer 32 in assembled operative relation upon the stem end portion 34a, suitable washers 50a and 50b preferably being interposed between the nut 46 and adjacent cup washer 32. If desired, the valve 16 may be bonded to the adjacent face of the spacer element 48. The cup washer 32 peripherally extends beyond the periphery of the spacer 48 and engages the inner wall surface of the cylindrical timing chamber 30 at an angle which freely permits downward movement of the valve stem 34 during unseating of the valve 16, but during valve seating movement of the valve, will act to impede the movement of the stem during a time interval as determined by the flow of water into the bottom end of the timing chamber 30 through a bleeder opening, as generally indicated by the numeral 52.

Figure 2:
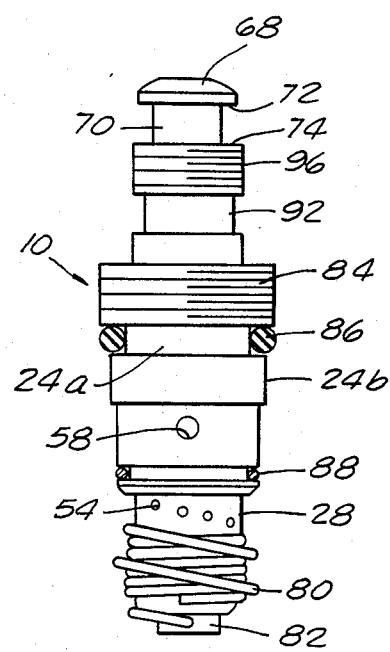
FIG. 2 is an elevational view of a cartridge unit, containing the valve members as a unified assembly.

As will be seen in FIG. 2, the dashpot cylinder 28 is provided with a plurality of spirally arranged flow openings 54, which permit, in the unseated position of the main valve 16, flow of water from the main inlet 18a through the annular valve seat 26 into the flow cavity 36 and thence through a metering passage 56 and connected passage 58 to the main outlet 20. Moreover, as shown in FIG. 1, the innermost of the openings 54 will operate to establish a relief flow communication with the timing chamber 30 just prior to movement of the main valve 16 into fully seated position, and thus enable the valve to move under the biasing force of a coiled spring 60 into fully seated position with a quick snap action.

The bore 42 is open at its outer end and provides an annular space around the stem 34 for the reception of the spring 60 which is relatively long and has a low rate characteristic. The inner end of spring 60 engages an abutment washer 62 having overlying engagement relation with an O-ring seal 64 for preventing fluid flow along the stem 34 from the flow cavity 36 into the bore 42.

The outer end of the stem 34 has a threaded connection, as indicated at 66, with an axially adjustable valve stem extension cap 68 that is constructed with a cylindrical shank portion 70 having its outer surface in sliding, guiding engagement with the inner wall at the open end of the bore 42. The inner end edge of the shank portion 70 is adapted to bear against the outer end of the coiled spring 60. As thus arranged, provision is made for manually adjusting the position of the cap 68 so as to vary the spacing distance, as indicated at (d), between a stop shoulder 72 on the cap and a stop shoulder 74 of the main body section 24a. The distance (d) corresponds to the opening movement stroke of the main valve from its seated position to a fully unseated position. Adjustments of the cap 68 on the stem is facilitated by providing appropriate tool receiving configurations. For example, a screwdriver receiving slot 76 is provided in the end face of the stem 34 to permit the stem to be held against rotation while the cap 68 is being rotatably adjusted by means of a wrench or other suitable tool engaged with parallel side faces 78—78 of the cap. This adjustment not only varies the biasing force of the spring 60, but also provides easy access means for adjusting and varying the closing time interval of the valve 16.

In order to obtain constancy of operation of the dashpot in controlling the timing interval of the closing movement of the valve 16 from its adjusted open position, the inlet fluid flow through the bleeder opening 52 is controlled by a fixed hydraulic restriction which comprises an elongate capillary tube 80 which is coiled around the exterior of the dashpot cylinder 28 and has its outlet end positioned within the timing chamber 30 adjacent its bottom wall, the outlet of this capillary tube serving to form the bleeder opening 52. The desired operating characteristics have been obtained by using a capillary tube which is nominally 0.013 inch inside diameter and approximately 1.5 feet in length. The inlet end of this tube is fitted with an uncompressed porous plastic filter element 82 of polyurethane foam or other suitable material, in order to prevent tube clogging.

The cartridge unit 10, as shown in FIG. 1, is arranged for mounting within the chamber 12 of the casing 14 and is secured in its operative position by means of an interconnecting threaded connection, as indicated by the numeral 84, appropriate sealing O-rings 86 and 88 being respectively positioned between the main body sections 24a and 24b, and the associated inner wall of the chamber 12.

Provision is also made for mounting the assembled cartridge unit 10 and receiving casing 14 in a position of use on an appropriate frame or supporting means, which in this case is shown as comprising a flat plate member, as indicated by the numeral 90. For such purpose, the main body section 24a is provided with a bonnet or neck portion 92 which is adapted to extend through a receiving opening 94 of the plate member 90. The outer end of this neck portion is formed with threads 96 for threaded engagement with a clamping nut 98; this nut coacting with a radial flange 100 on the body section 24a to fixedly secure a turret base portion 102, of a supporting bracket 104 for an actuating handle 106, in an operative position on the upper side of the plate member 90.

In the arrangement shown, the actuating handle 106 comprises a hinged lever which extends over the valve stem extension cap 68 and has one end pivotally connected for swinging movement by a pivot pin 108 to a hinge arm extension 110 of the turret base portion 102. The actuating handle 106 is biased for movement in a counterclockwise direction about the pivot pin 108 by means of a coiled spring 112 surrounding the pivot pin and having one end bearing against the hinge arm extension 110 and its other end bearing against an adjacent portion of the actuating handle 106. This spring normally biases the handle to a limit position wherein it engages an adjacent portion of the hinge arm extension 110, as indicated by the numeral 114.

As will be seen in FIG. 1, the handle 106 in its limit position is in spaced relation to the underlying stem extension cap 68, but upon being manually depressed, so as to pivot in a clockwise direction, it will engage the cap and move the stem 34 and valve 16 in an opening direction corresponding to the distance d. Upon releasing the handle 106, it will be moved counterclockwise to its stop limit, and thus free the stem 34 for biased movement by the spring 60 in a direction to seat the valve 16 in its closed position. It will be appreciated that the closing movement of the valve 16, from its unseated position to its fully seated position, will occur in a time interval determined by the operation of the dashpot and the adjusted setting of the stem extension cap 68.

From the foregoing description and drawings, it will be clearly evident that the delineated objects and features of the invention will be accomplished.

Various modifications may suggest themselves to those skilled in the art without departing from the spirit and scope of my invention and, hence, I do not wish to be restricted to the specific forms shown or the uses mentioned except to the extent indicated in the appended claims.

I claim:

1. A slow-closing valve mechanism for controlling the communication between main inlet and outlet liquid flow passages in a valve housing comprising:
    a cylinder forming a timing chamber having a valve seat at one end and an inwardly adjacent main flow inlet, and a bleeder opening at its opposite end;
    a valve stem extending through said valve seat into said chamber;
    a piston on the end of said stem in the chamber;
    a valve member on said piston movable into seated and non-seated relation with said seat;
    means normally biasing said piston and said valve member in a direction toward said valve seat;
    means for manually moving said piston and said valve member in a direction away from said seat; and
    means comprising an elongate capillary tube having convolutions adjacent said opposite end and providing a fixed hydraulic flow passage for controlling flow through said bleeder opening, the inlet end of said tube being in communication with said main inlet flow passage, and the outlet end of said tube being connected with said bleeder opening.

2. A valve mechanism according to claim 1, in which:
    a porous filter member is connected to an inlet end of said capillary tube.

3. A valve mechanism according to claim 2, in which:
    said capillary tube is positioned externally of said timing chamber, and
    said filter is in communication with said main inlet flow passage.

4. A valve mechanism according to claim 1, in which:
    said capillary tube is coiled around the exterior of said cylinder.

5. A valve mechanism according to claim 1, in which:
    said capillary tube has an inside diameter of nominally 0.013 inch and a length of approximately 1.5 feet.

6. A valve mechanism according to claim 5, in which:
    said capillary tube is positioned externally of said timing chamber and has an outlet end connected to form said bleeder opening to said timing chamber.

7. A valve mechanism according to claim 1, which includes:
    means for manually moving said valve member from said seated to said non-seated position.

8. A valve mechanism according to claim 7, in which:
    the closing time interval of said valve by said biasing means is determined by the unseated distance of said valve in relation to said seat.

9. A valve mechanism according to claim 8, which includes:
    manually adjustable means for increasing and decreasing the unseated distance of the valve with respect to said seat.

10. A valve mechanism according to claim 9, in which:
    said manually adjustable means is positioned at the outer end of the valve stem.

11. A valve mechanism according to claim 10, in which:
    the manually adjustable means comprises an axially adjustable stem extension.

12. A valve mechanism according to claim 10, in which:
- the outer end of said valve stem is conformed to receiving a tool for holding the stem against rotation; and
- the manually adjustable means comprises a stem end cap threadedly connected with the outer end of the stem and conformed to receive a tool for rotating it relative to the held stem.

13. A valve mechanism according to claim 12, in which:
- the inner end of the stem end cap engages the outer end of a relatively long low rate valve biasing coiled spring surrounding said stem.

14. A valve mechanism according to claim 1, which includes:
- a valve body assembly in which said timing chamber cylinder and said valve seat are positioned at the inner end of a valve body mounting section formed with an axial bore having guiding relation with said valve stem;
- a relatively long low rate valve biasing coiled spring in said bore surrounding said stem and having its inner end bearing against an abuting wall portion of said bore;
- an axially adjustable member carried by the outer end of said stem and having abutment engagement with the outer end of said spring; and
- manually operable means engageable with said member to move said valve in an unseating direction against the biasing force of said spring.

15. A valve mechanism according to claim 14; which includes:
- stop means engageable by said member to limit the extent of its movement by said manually operable means.

* * * * *